(12) United States Patent
Johnson et al.

(10) Patent No.: US 11,624,305 B2
(45) Date of Patent: Apr. 11, 2023

(54) VORTEX GENERATORS AND VIRTUAL MIXERS FOR AFTERTREATMENT SYSTEMS

(71) Applicant: Cummins Emission Solutions Inc., Columbus, IN (US)

(72) Inventors: Samuel Johnson, East Wenatchee, WA (US); Andrew J. Albers, West Lafayette, IN (US); Shashank Mishra, Cincinnati, OH (US); Otto A. Negron Rivas, Indianapolis, IN (US); Jeremy Dale Harris, Franklin, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/186,428

(22) Filed: Feb. 26, 2021

(65) Prior Publication Data
US 2021/0270171 A1  Sep. 2, 2021

Related U.S. Application Data

(60) Provisional application No. 62/984,030, filed on Mar. 2, 2020.

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC .. F01N 3/2066; F01N 3/2892; F01N 2610/02; F01N 2240/20; F01N 2610/1453;
(Continued)

(56) References Cited

U.S. PATENT DOCUMENTS

| 5,992,141 A | * | 11/1999 | Berri | ...................... B01D 53/90 60/274 |
| 2009/0071133 A1 | * | 3/2009 | Mabuchi | ............... F01N 3/2066 60/303 |

(Continued)

FOREIGN PATENT DOCUMENTS

EP  3321483 A1 * 5/2018 ........... F01N 3/2066

OTHER PUBLICATIONS

Adamiak, Kazimierz et al. "Dynamics of Water Droplet Distortion and Breakup in a Uniform Electric Field," IEEE Transactions On Industry Applications, vol. 47, No. 6, Nov./Dec. 2011, 10 pages.
(Continued)

*Primary Examiner* — Devon C Kramer
*Assistant Examiner* — Kelsey L Stanek
(74) *Attorney, Agent, or Firm* — Foley & Lardner LLP

(57) ABSTRACT

An aftertreatment system for treating constituents of an exhaust gas produced by an engine, comprising: a housing; a selective catalytic reduction (SCR) system disposed within the housing; a reductant injector disposed on a sidewall of the housing upstream of the SCR system and configured to insert a reductant into the exhaust gas; and a vortex generator disposed in the housing, the vortex generator comprising at least one deflector disposed on a surface within the housing, the at least one deflector configured to generate vortices in a portion of the exhaust gas flow flowing over the at least one deflector such that the portion of the exhaust gas remains attached to the surface at a downstream location of the surface.

11 Claims, 9 Drawing Sheets

(51) Int. Cl.
*F15D 1/00* (2006.01)
*F01N 3/28* (2006.01)
*B01F 23/213* (2022.01)
*B01F 25/10* (2022.01)
*B01F 25/314* (2022.01)
*B01F 25/431* (2022.01)
*B01F 33/05* (2022.01)

(52) U.S. Cl.
CPC ...... *B01F 23/2132* (2022.01); *B01F 23/2133* (2022.01); *B01F 25/103* (2022.01); *B01F 25/3141* (2022.01); *B01F 25/43161* (2022.01); *B01F 33/052* (2022.01); *F01N 3/2892* (2013.01); *F15D 1/009* (2013.01); *B01F 25/4315* (2022.01); *B01F 25/43163* (2022.01); *F01N 2610/02* (2013.01); *F01N 2610/11* (2013.01)

(58) Field of Classification Search
CPC .. F01N 3/0892; B01F 3/04049; B01F 3/0407; B01F 13/0005; B01F 5/0065; B01F 5/0473; B01F 5/0619; B01F 2005/0627; B01F 2005/0628; B01D 53/9418; B01D 53/9431; F15D 1/009; Y02T 10/12
USPC ........................................... 60/275, 324, 303
See application file for complete search history.

(56) References Cited

U.S. PATENT DOCUMENTS

| 2010/0107614 | A1* | 5/2010 | Levin | F01N 3/36 60/303 |
| 2011/0107743 | A1* | 5/2011 | Ranganathan | B01F 25/25 60/295 |
| 2011/0185710 | A1* | 8/2011 | Shimizu | B01F 25/3141 60/324 |
| 2012/0124983 | A1* | 5/2012 | Hong | B01F 25/3131 60/324 |

OTHER PUBLICATIONS

Durden, Rick, "Vortex Generators: 50 Years of Performance Benefits," AV Web, Mar. 9, 2014, 4 pages.

Lasheras, J. et al., "Break-up and atomization of a round waterjet by a high-speed annular air jet," J. Fluid Mech. (1998), vol. 357, pp. 351-379.

Taylor, Geoffrey, F.R.S. "Disintegration of water drops in an electric field, "Proceedings of the Royal Society of London. Series A, Mathematical and Physical Sciences vol. 280, No. 1382 (Jul. 28, 1964), pp. 383-397 (18 pages).

Yaningsih, Indri et al. "Impact of Blockage Ratio on Thermal Performance of Delta-Winglet Vortex Generators," Appl. Sci. 2018, 8, 181, Jan. 26, 2018, 14 pages.

* cited by examiner

VORTEX GENERATORS AND VIRTUAL MIXERS FOR AFTERTREATMENT SYSTEMS

CROSS-REFERENCE TO RELATED APPLICATIONS

The present application claims the benefit of U.S. Provisional Application No. 62/984,030, filed Mar. 2, 2020, the entire disclosure of which is hereby incorporated by reference herein.

TECHNICAL FIELD

The present disclosure relates generally to aftertreatment systems for use with internal combustion engines.

BACKGROUND

Exhaust aftertreatment systems are used to receive and treat exhaust gas generated by engines such as internal combustion engines. Conventional exhaust gas aftertreatment systems include any of several different components to reduce the levels of harmful exhaust emissions present in exhaust gas. For example, certain exhaust aftertreatment systems for diesel-powered internal combustion engines includes a selective catalytic reduction (SCR) system including a SCR catalyst formulated to convert $NO_x$ (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by the SCR catalyst. However, if the reductant is not substantially mixed with the exhaust gas, the inserted reductant may not completely decompose, which may lead to reductant deposits being formed on walls or various components of the aftertreatment system. Moreover, recirculation zones may be produced in the exhaust gas where a boundary layer of the exhaust gas becomes detached from the surface where the exhaust gas recirculation zones are present such as near bends in a housing of the aftertreatment system. The surfaces where the exhaust flow recirculates have a lower temperature and shear velocity. Thus, reductant droplets may contact those surfaces, which increase the probability of reductant deposits forming on such surfaces. Mixers having a plurality of vanes or other flow control features are typically used in aftertreatment systems to promote mixing of the reductant with the exhaust gas. Such mixers however, increase the back pressure of the exhaust gas, occupy significant space claim in the aftertreatment system, and increase weight of the aftertreatment system. Additionally, these types of mixers are often difficult to manufacture and are expensive.

SUMMARY

Embodiments described herein relate generally to mixers for promoting mixing of reductant with exhaust gas flowing through an aftertreatment system and reduce reductant deposits. In particular, embodiments described herein include vortex generators that are configured to generate vortices in the exhaust gas downstream of the vortex generator so as to cause an exhaust gas flow to remain attached to a downstream surface, which produces shear velocity and inhibits the recirculation of the exhaust gas, thus preventing reductant from contacting the downstream surface and reducing reductant deposits. Embodiments described herein also relate to a virtual mixer configured to generate an electric or electromagnetic field across the reductant spray as it exits the injection nozzle, which promotes droplet breakage and a faster decomposition rate in the exhaust stream, thus resulting in higher distribution and uniformity across an inlet face of the SCR system. This increase in decomposition and uniformity at the inlet face of the SCR system allows for a higher $NO_x$ conversion efficiency across the SCR system and thus lower emissions levels at an outlet of the aftertreatment system.

In some embodiments, an aftertreatment system for treating constituents of an exhaust gas produced by an engine comprises: a housing; a selective catalytic reduction (SCR) system disposed within the housing; a reductant injector disposed on a sidewall of the housing upstream of the SCR system and configured to insert a reductant into the exhaust gas; and a vortex generator disposed in the housing, the vortex generator comprising at least one deflector disposed on a surface within the housing, the at least one deflector configured to generate vortices in a portion of the exhaust gas flow flowing over the at least one deflector such that the portion of the exhaust gas remains attached to the surface at a downstream location of the surface.

In some embodiments, an aftertreatment system for treating constituents of an exhaust gas produced by an engine comprises: a housing; a selective catalytic reduction (SCR) system disposed within the housing; a reductant injector disposed on a sidewall of the housing upstream of the SCR system and configured to insert a reductant into the exhaust gas; and a virtual mixer disposed between the reductant injector and the housing, the virtual mixer comprising: an electromagnet defining an aperture configured to allow the reductant to be inserted therethrough into the housing, the electromagnet configured to generate an electromagnetic field across a spray plume of the reductant inserted by the reductant injector into the housing so as to cause an electrohydrodynamic effect on a plurality of reductant droplets included in the spray plume to increase a decomposition rate of the reductant in the exhaust gas.

In some embodiments, an aftertreatment system for treating constituents of an exhaust gas produced by an engine, comprises: a housing; a selective catalytic reduction (SCR) system disposed within the housing; a reductant injector disposed on a sidewall of the housing upstream of the SCR system and configured to insert a reductant into the exhaust gas; and a virtual mixer comprising: a cathode disposed on a first side of an outlet of the reductant injector, and an anode disposed on a second side of the outlet of the reductant injector, which is opposite the first side, the virtual mixer configured to generate an electric field between the cathode and the anode to induce electrolysis in the reductant prior to insertion of the reductant into the housing.

In some embodiments, an aftertreatment system for treating constituents of an exhaust gas produced by an engine, comprises: a housing; a selective catalytic reduction (SCR) system disposed within the housing; a reductant injector disposed on a sidewall of the housing upstream of the SCR system and configured to insert a reductant into the exhaust gas; and a vortex generator disposed in the housing, the vortex generator comprising at least one deflector disposed on a surface within the housing, the at least one deflector having a height in a range of 2 mm to 50 mm, inclusive, a width in a range of 1 mm to 2 mm, inclusive, and a length in a range of 5 mm to 30 mm, inclusive.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
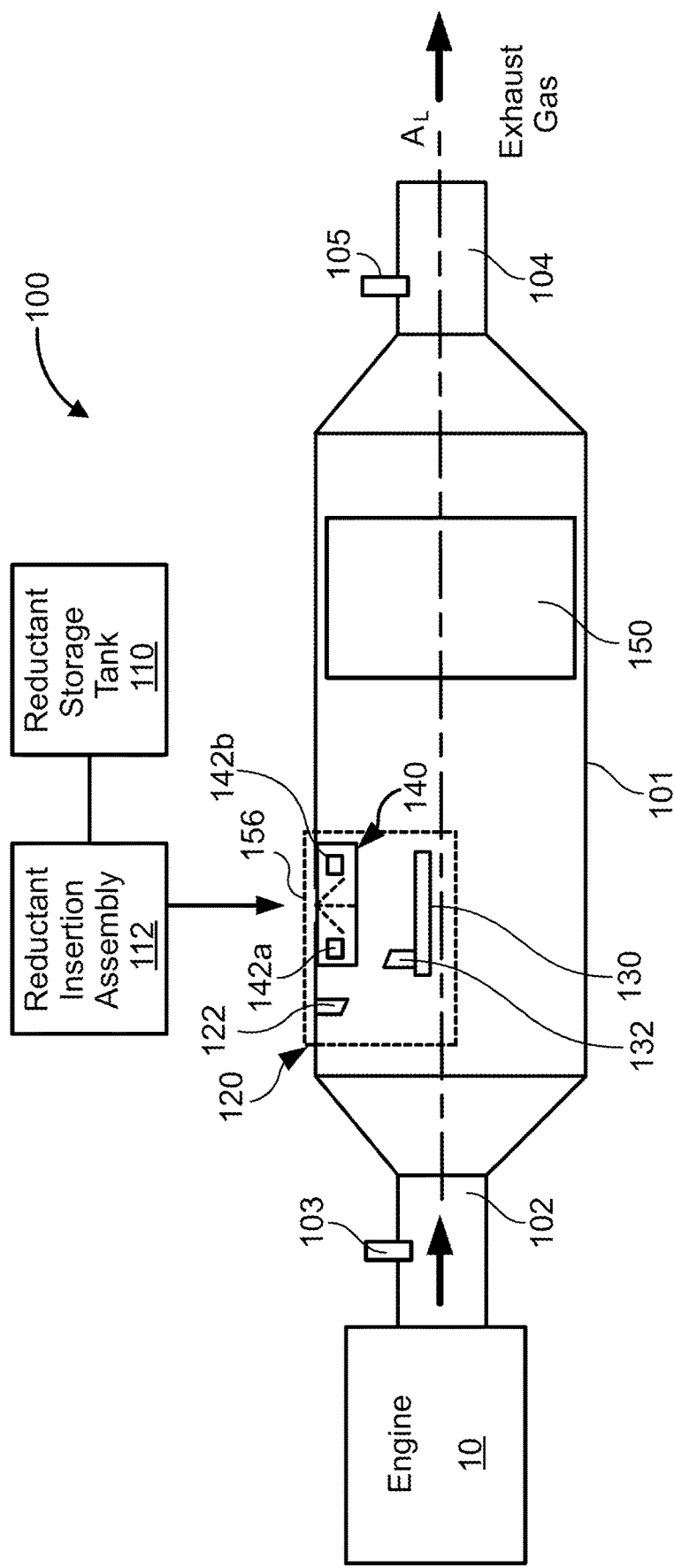
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to mixers for promoting mixing of reductant with exhaust gas flowing through an aftertreatment system for reducing reductant deposits. In particular, embodiments described herein relate to vortex generators that are configured to generate vortices in the exhaust gas downstream of the vortex generator so as to cause an exhaust gas flow to remain attached to a downstream surface and inhibit recirculation of the exhaust gas so as to inhibit reductant from impacting the downstream surface and reduce reductant deposits. Embodiments described herein also relate to a virtual mixer configured to generate an electric field across a reductant flow therethrough for breaking up droplets of reductant inserted into the exhaust gas and promote mixing of the reductant with the exhaust gas.

Exhaust gas flow conditioning devices are typically disposed in housings or exhaust conduits of aftertreatment system to mix the exhaust gas with a reductant inserted into the exhaust gas and disperse the exhaust gas uniformly to catalysts (e.g., SCR systems) disposed in the aftertreatment system. However, due to flow dynamic interactions of the exhaust gas as it flows through the aftertreatment system, any work done on the exhaust gas (e.g., flow diversion, mixing, etc.) causes a reaction. For example, disposing a mixer in the aftertreatment system increases a back pressure on the exhaust gas, and diverting flow in one section of the housing decreases flow in another section. A concern with diversion of flow is the creation of recirculation zones downstream in the exhaust gas flow.

This recirculation is caused by diversion of part of the exhaust gas flow from the bulk exhaust gas flow, which may occur due to large or sudden direction changes in the exhaust gas flow occurs. Recirculation zones trap reductant droplets that are introduced upstream in the exhaust gas flow which increases the probability of the reductant droplets contacting the surfaces of the housing and forming reductant deposits. A similar effect occurs near surfaces of the aftertreatment system due to the thickness of the boundary layer created by the exhaust gas flow over the surface. The flow of the exhaust gas at the boundary layer has a much lower velocity than the bulk exhaust gas flow. The low velocity boundary layer exerts a lower shear stress on the reductant droplets impinging on the low velocity boundary layer as well as decreases convective heat transfer to the surface of the housing, which increases the probability of reductant deposits being formed on the surface. While vane mixers, baffle plates or other flow mixing elements may be disposed in aftertreatment systems to increase mixing of the reductant with the exhaust gas, they increase back pressure, in addition to increasing the cost and manufacturing complexity of the aftertreatment system.

In contrast, various embodiments of the vortex generators and mixers for use in aftertreatment systems described herein may provide one or more benefits including, for example: (1) reducing recirculation zones, thereby reducing the probability of reductant droplet contacting surfaces of the aftertreatment system and forming reductant deposits; (2) creating vortices in the exhaust gas flow proximate to surfaces located downstream of the vortex generators, which increases exhaust gas velocity, shear stress, and convective heat transfer proximate to the surface and reduces reductant deposit formation; (3) improving mixing performance while reducing exhaust gas back pressure by allowing removal of complex mixers from the aftertreatment system; (4) reducing the amount of space occupied in the mixer, thereby reducing weight; (5) reducing complexity of internal mixer components, thereby reducing material and manufacturing costs; and (6) reducing part-to-part variation, which frequently occurs in complex vane geometry mixers, with tight dimensional tolerances.

FIG. 1 is a schematic illustration of an aftertreatment system 100, according to an embodiment. The aftertreatment system 100 is configured to receive exhaust gas (e.g., diesel exhaust gas from an engine 10) and treat constituents (e.g., $NO_x$, CO, $CO_2$) of the exhaust gas. The aftertreatment system 100 includes a reductant storage tank 110, a reductant insertion assembly 112, a vortex generator 120, a virtual mixer 140, and a SCR system 150.

The engine 10 may be, for example, a diesel engine, a gasoline engine, a natural gas engine, a dual fuel engine, a biodiesel engine, an E-85 engine, or any other suitable engine). The engine 10 combusts fuel and generates an exhaust gas that includes $NO_x$, CO, $CO_2$, and other constituents.

The aftertreatment system 100 includes a housing 101 within which components of the aftertreatment system 100 are disposed. The housing 101 may be formed from a rigid, heat-resistant and corrosion-resistant material, for example, stainless steel, iron, aluminum, metals, ceramics, or any other suitable material. The housing 101 may have any suitable cross-section, for example, circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter and/or reduce constituents of the exhaust gas such as $NO_x$ gases, CO, unburnt hydrocarbons, etc. included in the exhaust gas by the SCR system 150).

A first sensor 103 may be positioned in the inlet conduit 102. The first sensor 103 may comprise a $NO_x$ sensor configured to measure an amount of $NO_x$ gases included in the exhaust gas flowing into the SCR system 150 and may include a physical sensor or a virtual sensor. In various embodiments, a temperature sensor, a pressure sensor, an oxygen sensor, or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_x$ sensor configured to determine an amount of $NO_x$ gases expelled into the environment after passing through the SCR system 150. In other embodiments, the second sensor 105 may comprise a particulate matter sensor configured to determine an amount of particulate matter in the exhaust gas being expelled into the environment. In still other embodiments, the second sensor 105 may comprise an ammonia sensor configured to measure an amount of ammonia in the exhaust gas flowing out of the SCR system 150, i.e., determine the ammonia slip. This may be used as a measure of a catalytic conversion efficiency of the SCR system 150 for adjusting an amount of reductant to be inserted into the SCR system 150, and/or adjusting a temperature of the SCR system 150 so as to allow the SCR system 150 to effectively use the ammonia for catalytic decomposition of the $NO_x$ gases included in the exhaust gas flowing therethrough. In some embodiments, an ammonia oxidation ($AMO_x$) catalyst may be positioned downstream of the SCR system 150 so as to decompose any unreacted ammonia in the exhaust gas downstream of the SCR system 150.

While not shown the aftertreatment system 100 may include various other components such as an oxidation catalyst (e.g., a diesel oxidation catalyst) positioned upstream of the SCR system 150 and configured to decompose unburnt hydrocarbons and/or CO included in the exhaust gas. In some embodiments, a filter may be disposed downstream of the oxidation catalyst and upstream of the SCR system 150 and configured to remove particulate matter (e.g., soot, debris, inorganic particles, etc.) from the exhaust gas.

The SCR system 150 is formulated to decompose constituents of an exhaust gas flowing therethrough in the presence of a reductant, as described herein. In some embodiments, the SCR system 150 may include a selective catalytic reduction filter (SCRF). The SCR system 150 includes a catalyst formulated to catalyze the decomposition of $NO_x$ gases. Any suitable catalyst may be used such as, for example, platinum, palladium, rhodium, cerium, iron, manganese, copper, vanadium based catalyst, any other suitable catalyst, or a combination thereof. The catalyst may be disposed on a suitable substrate such as, for example, a ceramic (e.g., cordierite) or metallic (e.g., kanthal) monolith core which can, for example, define a honeycomb structure. A washcoat can also be used as a carrier material for the SCR system 150. Such washcoat materials may include, for example, aluminum oxide, titanium dioxide, silicon dioxide, any other suitable washcoat material, or a combination thereof.

A reductant injector 156 is disposed on the housing 101 upstream of the SCR system 150 and configured to insert a reductant into the exhaust gas flowing through the housing 101. In some embodiments, the reductant injector 156 may be disposed in a reductant port defined in the housing 101. In various embodiments, the reductant injector 156 may comprise a nozzle having a predetermined diameter, and configured to insert a jet, a stream, or a cone of the reductant into the exhaust gas.

The reductant storage tank 110 is structured to store a reductant. The reductant is formulated to facilitate decomposition of the constituents of the exhaust gas (e.g., $NO_x$ gases included in the exhaust gas). Any suitable reductant may be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In some embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 112 is fluidly coupled to the reductant storage tank 110. The reductant insertion assembly 112 is configured to selectively insert the reductant into the exhaust gas via the reductant injector 156. The reductant insertion assembly 112 may comprise various structures to facilitate receipt of the reductant from the reductant storage tank 110 and delivery to the SCR system 150, for example, pumps, valves, screens, filters, etc.

The aftertreatment system 100 also includes a vortex generator 120 disposed in the housing 101. The vortex generator 120 comprises at least one deflector disposed on a surface within the housing 101, and configured to generate vortices in a portion of the exhaust gas flow flowing over the at least one deflector such that the portion of the exhaust gas remains attached to the surface at a downstream location of the surface. In some embodiments, the reductant injector 156 is disposed in a reductant port defined in the housing 101 and configured to insert the reductant through the reductant port. In such embodiments, the vortex generator 120 may include a deflector 122 disposed on a surface which is located proximate to the reductant port (e.g., the same side as the reductant port) and upstream of the reductant port. In some embodiments, the deflector 122 or any other deflector described herein may have a height in a range of 2 mm to 50 mm, inclusive, a width in a range of 1 mm to 2 mm, inclusive, a length in a range of 5 mm to 30 mm, inclusive, and a an inclination angle with respect to a flow axis of the exhaust gas in a range of 1 degrees to 60 degrees, inclusive.

In various embodiments, the deflector 122 may be disposed upstream or downstream of the reductant injector 156. When disposed downstream, the deflector 122 may be disposed sufficiently downstream so as not to be located in an impingement zone of the reductant inserted by the reductant injector 150, or a zone that sees a large amount of liquid reductant. In some embodiments in which the deflector 122 is disposed upstream of reductant injector 156, a linear distance of the deflector 122 from the reductant injector 156 may be in a range of 5 mm to 150 mm, inclusive. In some embodiments in which the deflector 122 may be disposed downstream of reductant injector 156, the linear distance of the deflector 122 from the reductant injector 156 may be in a range of 300 mm to 1,000 mm.

In some embodiments, the deflector 122 or any other deflector described herein may have a flat profile. In other embodiments, the deflector 122 or any other deflector described herein may have different axial or cross-sectional shapes, for example, an airfoil like cross-section and axial shape. Moreover, a surface finish of the deflector 122 may also be tuned for laminar vs. turbulent boundary layers on each side of the deflector 122. This may allow optimal control of exhaust gas flow while maintaining low backpressure and high shear velocity on all downstream surfaces of the aftertreatment system 100.

Figure 2:
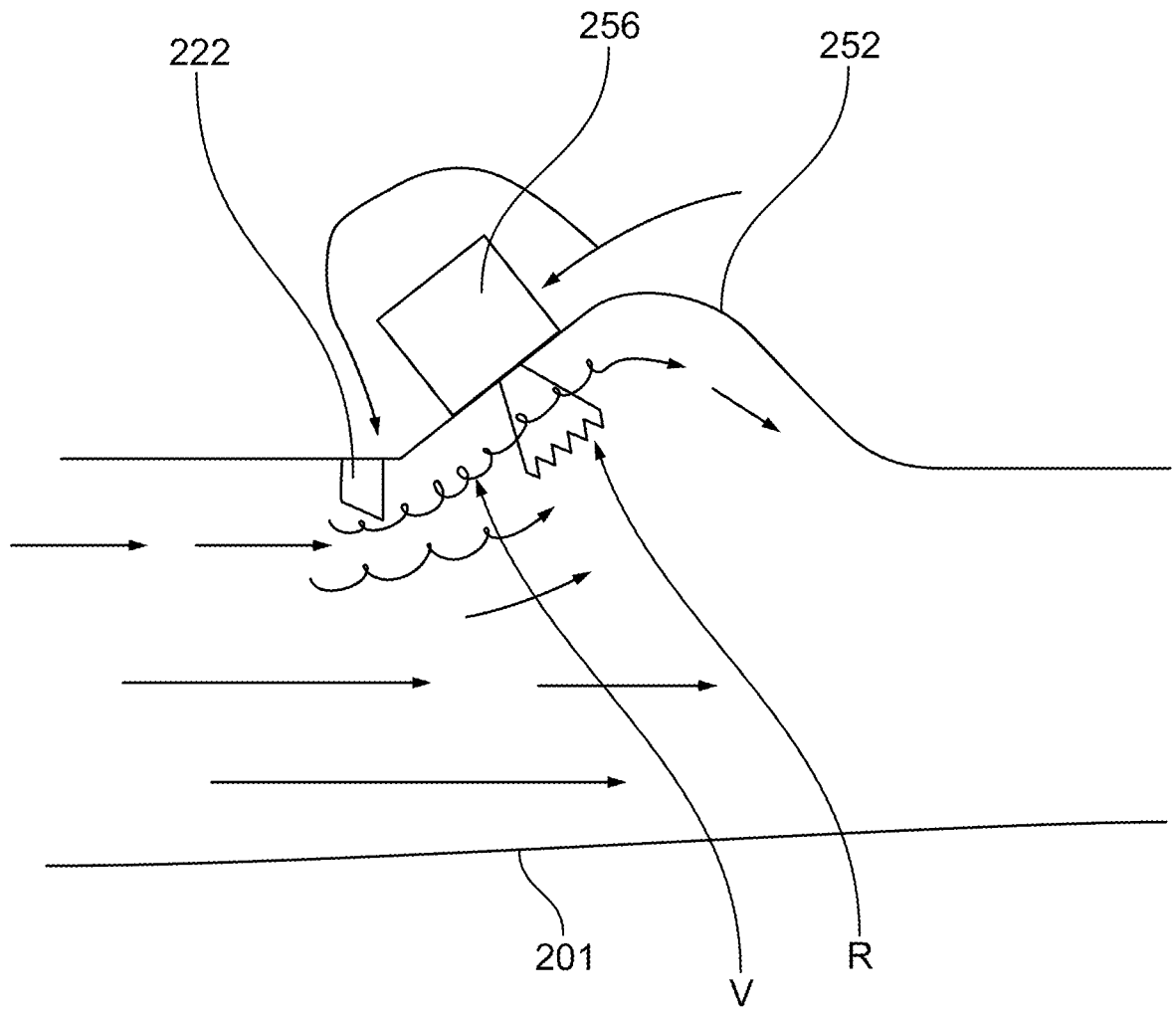
FIG. 2 is a schematic illustration of a vortex generator that may be included in an aftertreatment system, according to an embodiment.
Figure 3:
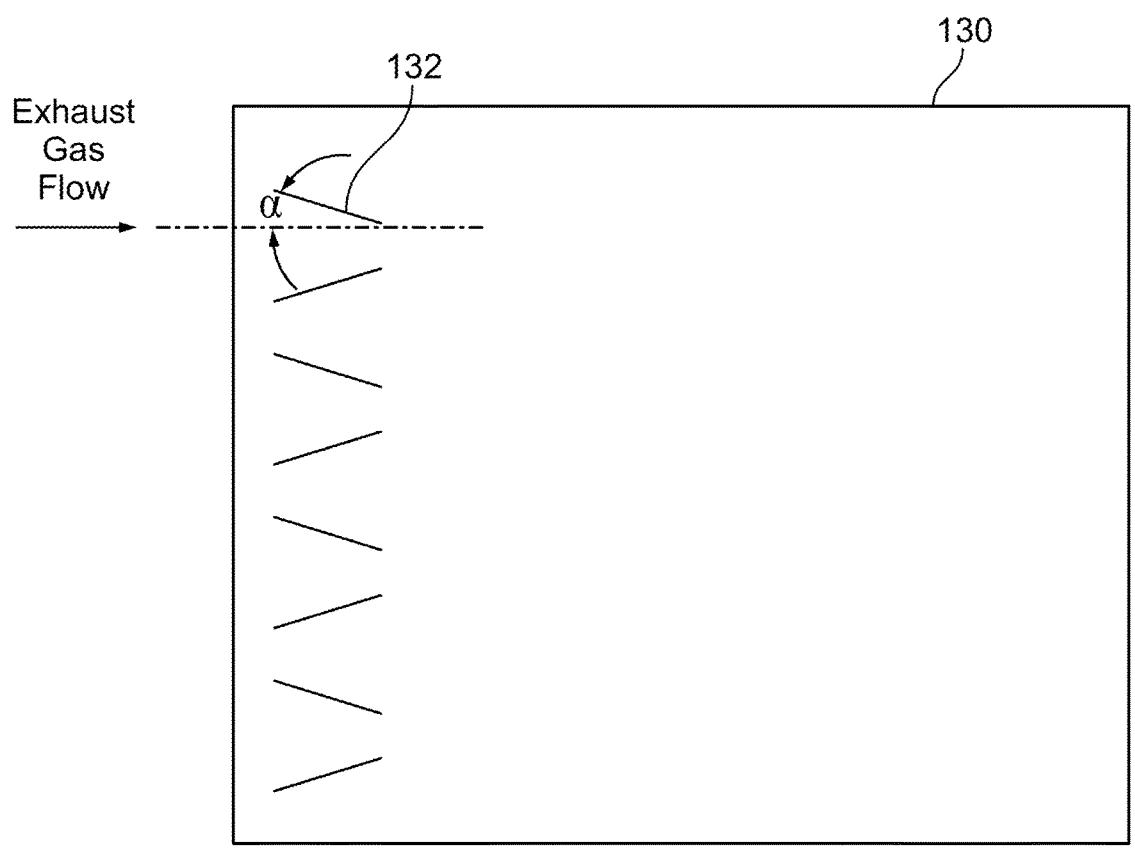
FIG. 3 is a top view of a vortex generator that may be included in the aftertreatment system of FIG. 1, according to an embodiment.
Figure 4:
FIG. 4 is a side view of the vortex generator of FIG. 3.
Figure 5:
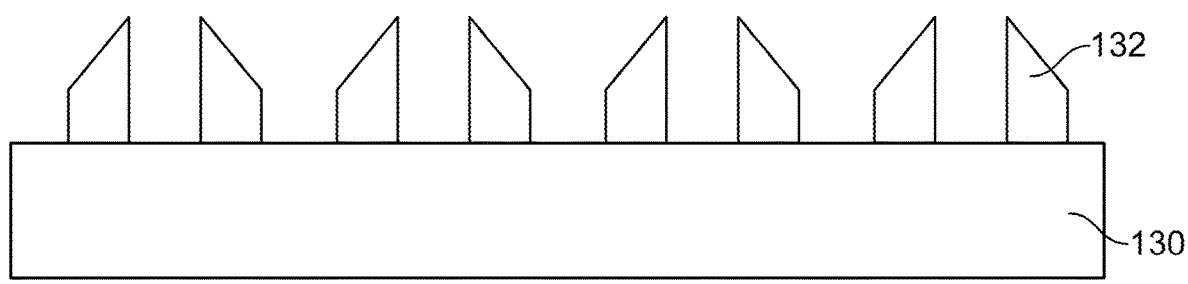
FIG. 5 is a front view of the vortex generator of FIG. 3.

For example, FIG. 2 shows a schematic illustration of a portion of a housing 201, according to an embodiment. A reductant port 252 is defined in a wall of the housing 201 on which a reductant injector 256 is mounted and configured to insert reductant R into the exhaust gas flow through the reductant port 252. The reductant port 252 includes a recess defined in a wall of the housing 201. Exhaust flow proximate to the reductant port 252 can get detached from a surface of the housing 201 within the reductant port 252, which can lead to an increase in reductant deposit formation within the reductant port 252.

To maintain exhaust gas flow near the surface of the reductant port 252, a vortex generator including a deflector 222 is disposed on an inner surface of the housing 201 proximate to the reductant port 252 and upstream thereof. The deflector 222 may have a triangular shaped tip. The deflector 222 may have any suitable shape, size, or dimensions as described with respect to the deflector 122. The deflector 222 disrupts exhaust gas flow creating vortices V in the exhaust gas downstream of the deflector 222. The vortices V remain attached to the surface of the reductant port 252 and cause the exhaust gas to intercept the reductant R, enhancing mixing of the reductant R with the exhaust gas and increasing convective heat transfer, thereby reducing reductant deposits.

In some embodiments, the vortex generator 120 may additionally or alternatively include an impaction plate 130 including at least one deflector 132. Referring also now to FIGS. 3-6B, the impaction plate 130 may be disposed in the housing 101 of the aftertreatment system 100 or any other aftertreatment system described herein. The impaction plate 130 may be disposed within the housing 101 along an axial flow path of the exhaust gas flowing through the housing 101. The impaction plate 130 is disposed along an injection axis of the reductant injector 156 such that the reductant inserted by the reductant injector 156 is configured to impact the impaction plate 130.

In various embodiments, the impaction plate 130 may have a length in an axial direction with respect to the exhaust flow in range of 20 mm to 100 mm, inclusive, and a width perpendicular to exhaust flow in a range of 30 mm to 100 mm, inclusive. In some embodiments, a linear axial distance of the impaction plate 130 from the reductant injector 156 may be in a range of 50 mm to 250 mm, inclusive, and a location of a leading edge of the impaction plate 130 relative to the direction of exhaust gas flow may be in a range of 0 mm to 50 mm axially upstream of the reductant injector 156.

The dimensions and position of the impaction plate 130 may be based on a cone angle of the reductant spray ejected by the reductant injector 156 and the linear axial distance of the impaction plate 130 from the reductant injector 156. Regardless, the impaction plate 130 is located such that the deflectors 132 are located on the leading edge of the impaction plate 130 and upstream of a location where the reductant impinges on the impact plate 130. Additionally, a surface geometry and/or surface finish of the impaction plate 130 may be tuned, and/or the impaction plate 130 may be formed from a material selected to enhance vortex generation and reduce boundary layer thickness.

A plurality of deflectors 132 are disposed on the impaction plate 130 upstream of the reductant injector 156. In some embodiments, a spacing between adjacent deflectors 132 may be in a range of 10 mm to 30 mm, inclusive. In some embodiments, at least one deflector 132 of the plurality of deflectors 132 may have at least one surface that is oriented at an angle $\alpha$ (e.g., in a range of 1 degrees to 60 degrees) with respect to a direction of the exhaust gas flow. The one or more angled deflectors 132 cause a change in direction of the exhaust gas so as to cause swirling in the exhaust gas flow which promotes mixing. Thus, swirling may be produced without the use of complex vane mixers. In some embodiments, adjacent deflectors 132 of the plurality of deflectors may be oriented at opposing angles to each other to create adjacent exhaust gas streams that swirl in opposing directions. Moreover, while FIGS. 3-6 show the impaction plate 130 as a flat plate, in other embodiments an impaction plate may define a curvature, for example, corresponding to a curvature of the housing 101. For example, FIG. 6B is a schematic illustration of an impaction plate 130b, according to another embodiment. The impaction plate 130b includes one or more deflectors 132b disposed on an upstream end thereof. However, different from impaction plate 130, a plurality of dimples 134b are formed on at least a surface of the impaction plate 130b that faces the reductant injector 156. The plurality of dimples 134b may generate a turbulent boundary layer on the surface of the impaction plate 130b, thereby increasing convective heat transfer and shear velocity of the exhaust gas.

Figure 6A:
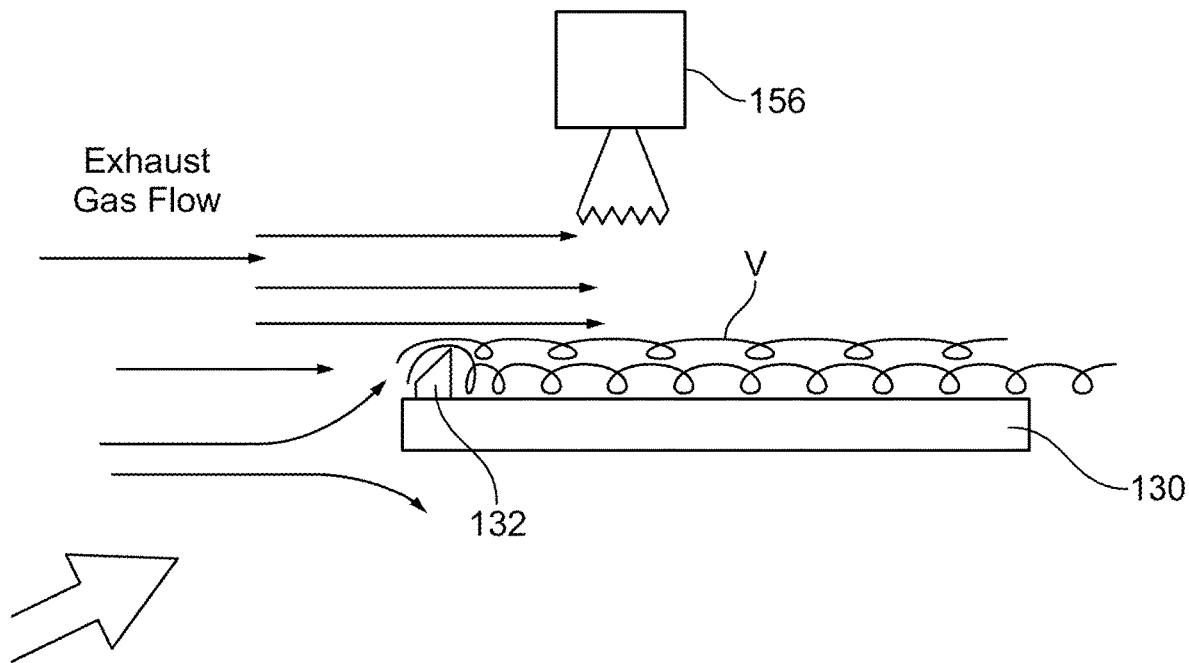
FIG. 6A is a schematic illustration of the vortex generator of FIG. 3 disposed in an aftertreatment system, according to an embodiment.
Figure 6B:
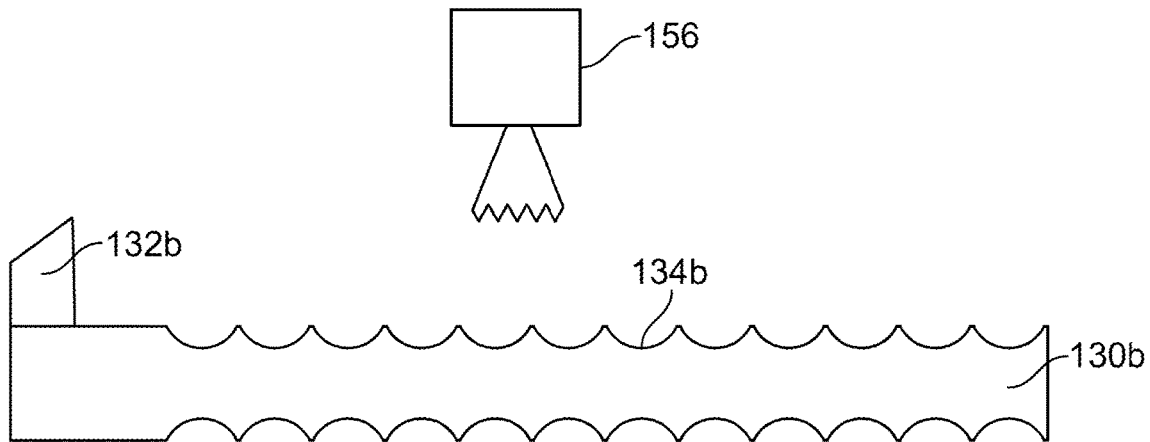
FIG. 6B is a schematic illustration of a vortex generator, according to another embodiment.

As shown in FIG. 6A, the plurality of deflectors 132 cause vortices V to be generated in the exhaust gas flowing over the deflectors 132 causing the exhaust gas vortices V to remain attached to a surface of the impaction plate 130 on which the reductant is being inserted. The vortices V reduce the boundary layer thickness of the exhaust gas on the surface of the impaction plate 130 which increases convective heat transfer and increases shear force on the reductant droplets impinging on the impaction plate 130. This facilitates mixing of the reductant with the exhaust gas because of the vortices V and the increased heat transfer facilitates evaporation of the reductant thus reducing reductant deposit formation.

Figure 7:
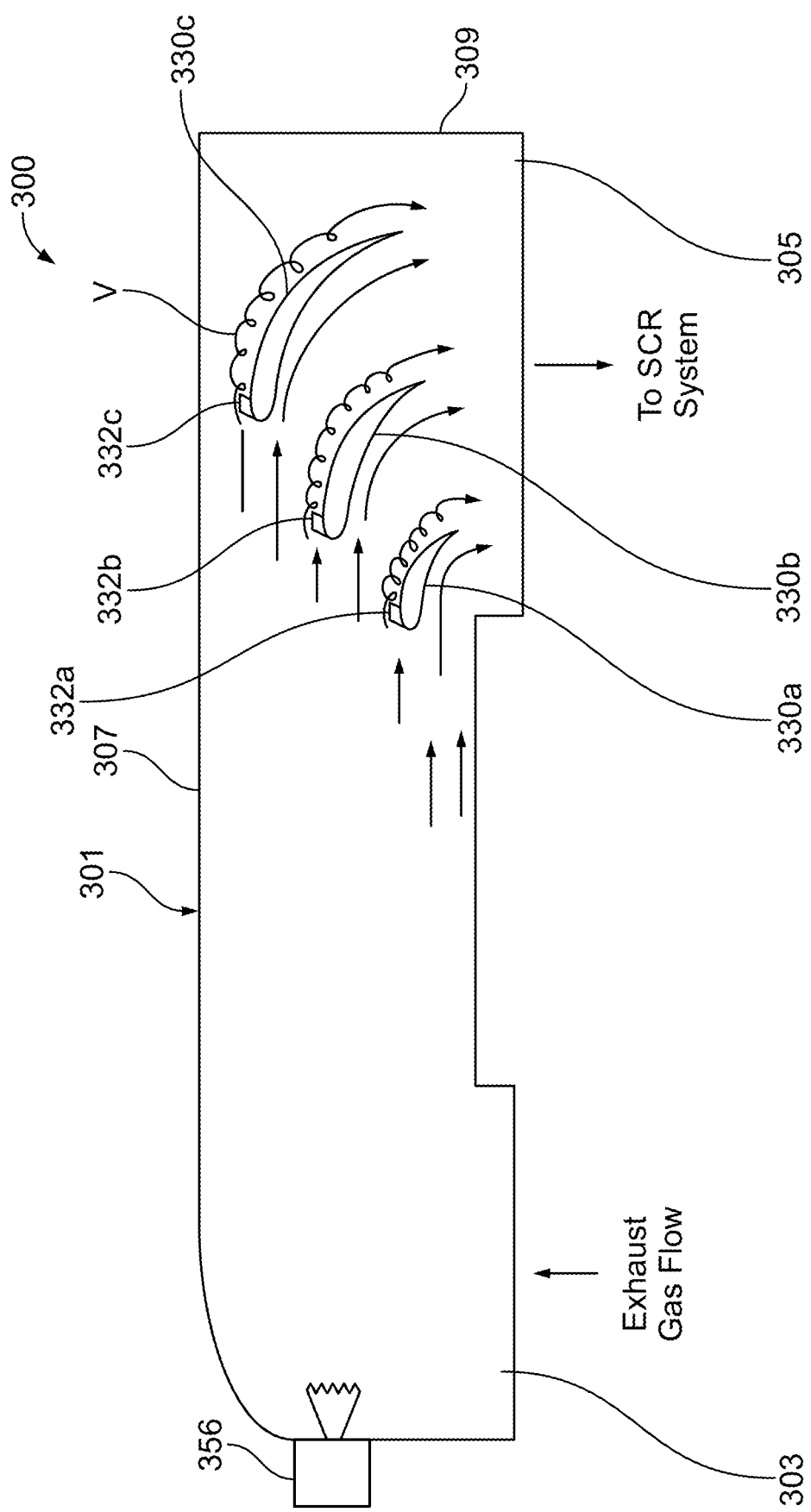
FIG. 7 is a schematic illustration of a portion of an aftertreatment system including airfoils with vortex generators, according to an embodiment.

In some embodiments, a housing for an aftertreatment system may include one or more bends. For example, FIG. 7 is a schematic illustration of a portion of an aftertreatment system 300, according to embodiment. The aftertreatment system 300 includes a housing 301 that includes a plenum portion 307 defining an inlet 303. The inlet 303 is oriented at a non-zero angle (e.g., perpendicular) to a flow axis of the plenum portion 307 such that exhaust gas entering the inlet 303 experiences a change in direction of about 90 degrees as it enters the plenum portion 307 from the inlet 303. A reductant injector 356 is disposed on a surface of the housing 301 proximate to the inlet 303. While not shown, in some embodiments, a vortex generator (e.g., a deflector) may be disposed on a wall of the housing 301 on which the reductant injector 356 is mounted upstream of the reductant injector 356.

The plenum portion 307 defines an outlet 305 that is also oriented at a non-zero angle (e.g., perpendicular) to the flow axis of the plenum portion 307 and communicates the exhaust gas to a downstream SCR system (e.g., the SCR system 150). A bend 309 is located at an end of the plenum portion 307 to cause a change in the direction of the exhaust gas flowing through the plenum portion 307 towards the outlet 305. A plurality of airfoils 330a, 330b, and 330c are disposed in the bend 309. The airfoils 330a, 330b, 330c define a curvature such that the airfoils 330a, 330b, 330c curve from the plenum portion 307 towards the outlet 305 and direct the exhaust gas flow from the plenum portion 307 to the outlet 305. In some embodiments, the plurality of airfoils 330a, 330b, 330c may have a chord length measured axially along the exhaust gas flow in a range of 30 mm to 100 mm, inclusive, a width measured perpendicular to the exhaust gas flow in a range of 60 mm to 700 mm, inclusive a max thickness in a range of 1 mm to 5 mm, inclusive, and a radius of camber curvature greater than 50 mm. The airfoils 330a, 330b, 330c reduce flow recirculation as the exhaust gas flow changes direction towards the outlet 305. The airfoils 330a, 330b, 330c may also increase exhaust gas velocity as the exhaust gas flows over the airfoils 330a, 330b, 330c so that a shear stress experienced by reductant droplets entrained in the exhaust gas increases enhancing mixing, as well as convective heat transfer is increased. This may reduce reductant droplet attachment on the inner surfaces of the housing 101, thereby reducing reductant deposits.

One or more deflectors 332a, 332, 332c are dispose at a leading edge of the airfoils 330a, 330b, 330c, respectively, which faces the exhaust gas flow, and may have any suitable shape, size, or dimensions as described with respect to the deflector 132. The deflectors 332a, 332b, 332c serve as vortex generators causing vortices V to be formed downstream of the deflectors 332a, 332b, 332c on the airfoil surface. The vortices V cause the exhaust gas flow to remain attached on the surface of the airfoils 330a, 330b, 330c as the exhaust gas changes direction and decreases boundary layer thickness, thereby further increasing shear stress and convective heat transfer and reducing reductant deposits.

Referring again to FIG. 1, the aftertreatment system 100 also includes a virtual mixer 140 disposed in the housing 101 upstream of the SCR system 150. As previously described herein, conventional aftertreatment systems include mixers including vanes and/or other components to facilitate mixing of the reductant with the exhaust gas. Such conventional mixers are however, heavy, occupy significant space in the aftertreatment system 100, and increase back pressure on the exhaust gas. In contrast, the virtual mixer 140 includes at least one electrode configured to generate an electromagnetic field across the a reductant spray inserted by the reductant injector 156 electrohydrodynamically cause droplets of the reductant inserted into the exhaust gas to break into smaller droplets and increasing mixing without using complex mixing parts, or electrolyze the reductant being inserted.

For example, as shown in FIG. 1, the virtual mixer 140 may include an electromagnet comprising a first electrode 142a and/or second electrode 142b disposed proximate to injection site for the reductant. While shown as including two electrodes 142a and 142b, in some embodiments, the virtual mixer 140 may include a single electromagnet defining an aperture through which the reductant is inserted into the housing 101. In some embodiments, the virtual mixer 140 may include a mounting plate on which the reductant injector 156 is mounted, and the electromagnet is integrated into the mounting plate such that a spray plume of the reductant passes through a center of the magnetic field.

The first electrode 142a and/or the second electrode 142b may include any suitable electromagnetic design, for example, any suitable coil type and configuration, geometry, cross-sectional width (e.g., diameter), and material types. Moreover, electrical inputs to the first electrode 142a and/or the second electrode 142b may be optimized to produce maximum electrohydrodynamic effect on the reductant droplets, which promotes droplet breakage or atomization of the reductant, thus increasing the decomposition rate of the reductant in the downstream exhaust flow. In some embodiments, the induced magnetic field is applied to the concentrated portion of the reductant spray plume within 0 mm to 30 mm of an outlet (e.g., tip of a nozzle) of the reductant injector 156. This forces a large percentage of the reductant flow to interact with the strongest area of the magnetic field, thus inducing the largest hydrodynamic effect on the corresponding liquid droplets passing through the field.

The electromagnet may utilize a range of voltages, for example, from 5 Volts to 48 Volts, and power from 25 Watts to 150 Watts. The electrical input frequency and polarity can be optimized to induce the most effective and efficient hydrodynamic effect on the reductant spray at various flow rates. In some embodiments, a cooling jacket and/or specialized thermal isolating features may be provided in the mounting plate of the reductant injector to maintain desired operating temperatures for the electromagnet (e.g., the first and/or second electrodes 142a, 142b). A low flow of reductant can be used in the cooling jacket to sink heat back to the reductant storage tank 110.

In some embodiments, the virtual mixer 140 may be configured for electrolysis. For example, the first electrode 142a may serve as a cathode and the second electrode 142b may serve as an anode. A form of electrolysis may applied to the high pressure reductant flow before it exits the outlet of the reductant injector 156 by applying a voltage across the first electrode 142a and the second electrode 142b. The electrical energy applied to the reductant will begin separating and ionizing the molecules within the reductant flow, thus increasing the decomposition rate of reductant after injection into the high temp exhaust gas stream.

In some embodiments, the virtual mixer 140 may be integrated within the reductant injector 156 by integrating the first electrode 142a and the second electrode 142b within a housing of the reductant injector 156 on opposing sides of the outlet (e.g., upstream of the outlet). The first electrode 142a and the second electrode surfaces may be exposed to the liquid reductant inside the reductant injector 156. In some embodiments, the first and second electrodes 142a and 142b are electrically insulated from a body of the reductant injector 156 using an insulating material that surrounds the conductive material within each of the electrodes 142a and 142b. The positioning of the electrodes 142a and 142b within the reductant injector 156 may be selected to optimize electrical efficiency and to generate maximum electrolytic effect on the reductant flow within the reductant injector 156, thus maximizing the decomposition rate of the reductant after injection into the hot exhaust gas stream. Lead wires of the first and second electrodes 142a and 142b may be integrated to injector circuitry and/or wiring harness of the reductant injector 156. The electrical input may be tuned to optimize the electrolytic effect on the reductant at various flow rates. For example, input voltages may range from 5 Volts to 48 Volts and input power may range from 25 Watts to 150 Watts.

Figure 8:
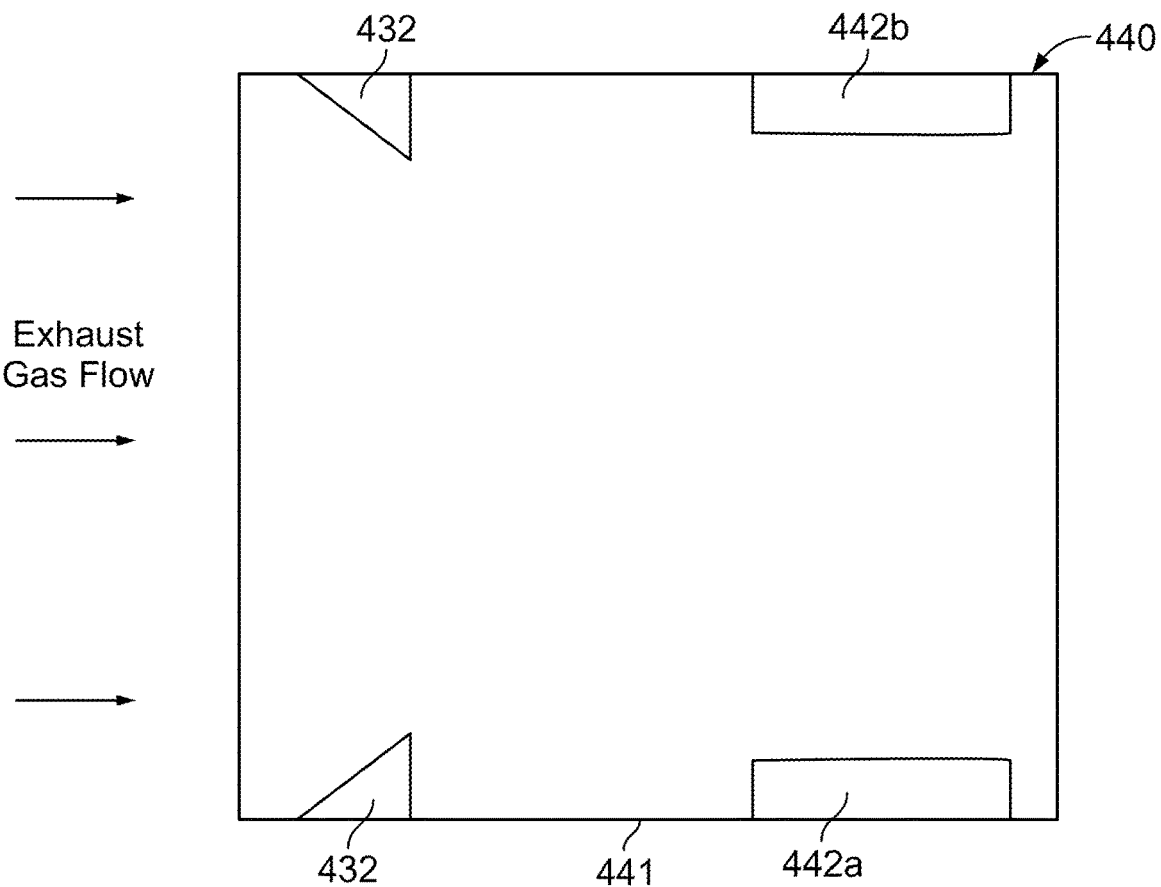
FIG. 8 is a side cross-section of a virtual mixer that may be included in the aftertreatment system of FIG. 1, according to an embodiment.

In some embodiments, a virtual mixer may also include deflectors for redirecting flow and/or generating vortices downstream of the deflectors. For example, FIG. 8 shows a side cross-section view of a virtual mixer 440, according to an embodiment. The virtual mixer 440 includes a mixer tube 441 having a pair of electrodes 442a, 442b disposed on opposing radial ends of the mixer tube 441 proximate to a downstream end of the mixer tube 441 and configured to apply an electric field thereacross, as previously described herein. A plurality of deflectors 432 are disposed on in the mixer tube 441 proximate to an upstream end of the mixer tube 441. The deflectors 432 are configured to generate vortices downstream of the deflectors 432 for reducing reductant deposits, as previously described herein. Moreover, the deflectors 432 may be inclined at an angle (e.g., in a range of 5 degrees to 60 degrees) relative to the direction of the exhaust gas flow so as generate swirls in the exhaust gas flow and enhance mixing.

Figure 9:
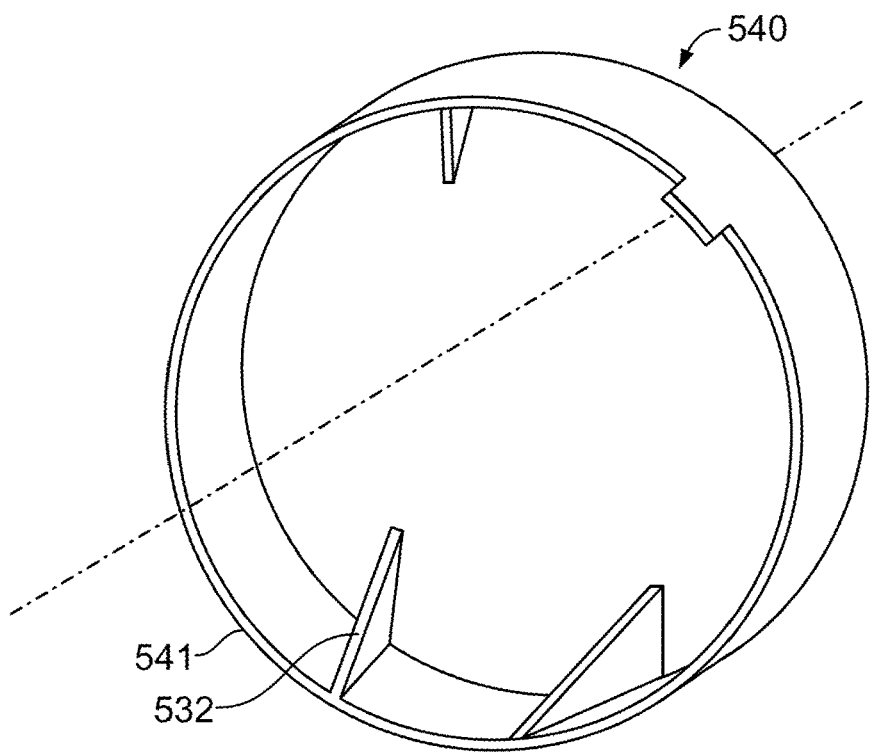
FIG. 9 is a front perspective view of a mixer, according to an embodiment.

FIG. 9 shows a front perspective view of a mixer 540, according to another embodiment. The mixer 540 includes a mixer tube 541 that is generally cylindrical in shape. Moreover, a plurality of deflectors 532 are disposed in the mixer tube 541 at an upstream end of the mixer tube 541 and configured to generate vortices on a downstream surface of the mixer tube 541 and/or generate swirls in the exhaust gas flow.

Figure 10:
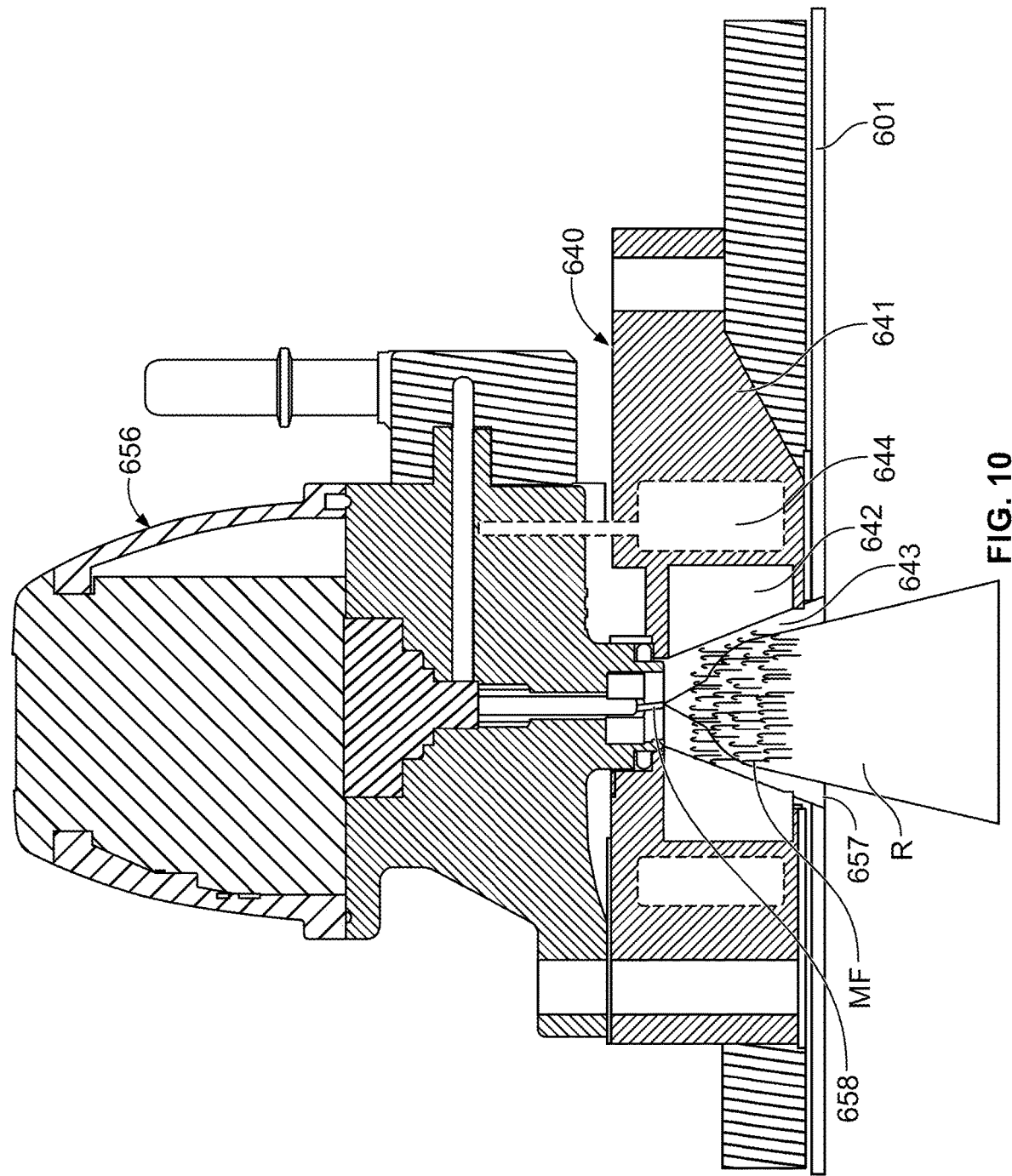
FIG. 10 is a side cross-section view of a reductant injector and a virtual mixer disposed between the reductant injector and a housing of an aftertreatment system, according to an embodiment.

FIG. 10 is a side cross-section view of a reductant injector 656 and a virtual mixer 640 disposed downstream of the reductant injector 656, according to an embodiment. The virtual mixer 640 comprises a mounting plate 641 disposed on sidewall of a housing 601 of an aftertreatment system (e.g., the aftertreatment system 100) around a reductant port 657 defined in the sidewall. The reductant injector 656 may be mounted on the mounting plate 641 such that the virtual mixer 640 is disposed between the reductant injector 656 and the housing 601.

The virtual mixer 640 includes an electromagnet 642 defining an aperture 643 configured to allow the reductant ejected from an outlet 658 of the reductant injector 656 to be inserted therethrough into the housing 610. The electromagnet 642 is configured to generate an electromagnetic field MF across a spray plume R of the reductant inserted by the reductant injector 656 into the housing 601. The electromagnetic field MF causes an electrohydrodynamic effect on a plurality of reductant droplets included in the spray plume R to increase a decomposition rate of the reductant in the exhaust gas. In some embodiments, coolant chambers 644 may be defined in the mounting plate 641, for example, to cool the electromagnet 642. In some embodiments, the magnetic field may be generated by applying a voltage in a range of 5 Volts to 50 Volts, or an electric power in a range of 25 Watts to 150 Watts to the electromagnet 642. A geometry, number of coils, manufacturing material, and/or voltage frequency may be adjusted to maximize the electrohydrodynamic effect on the spray plume R of the reductant.

Figure 11:
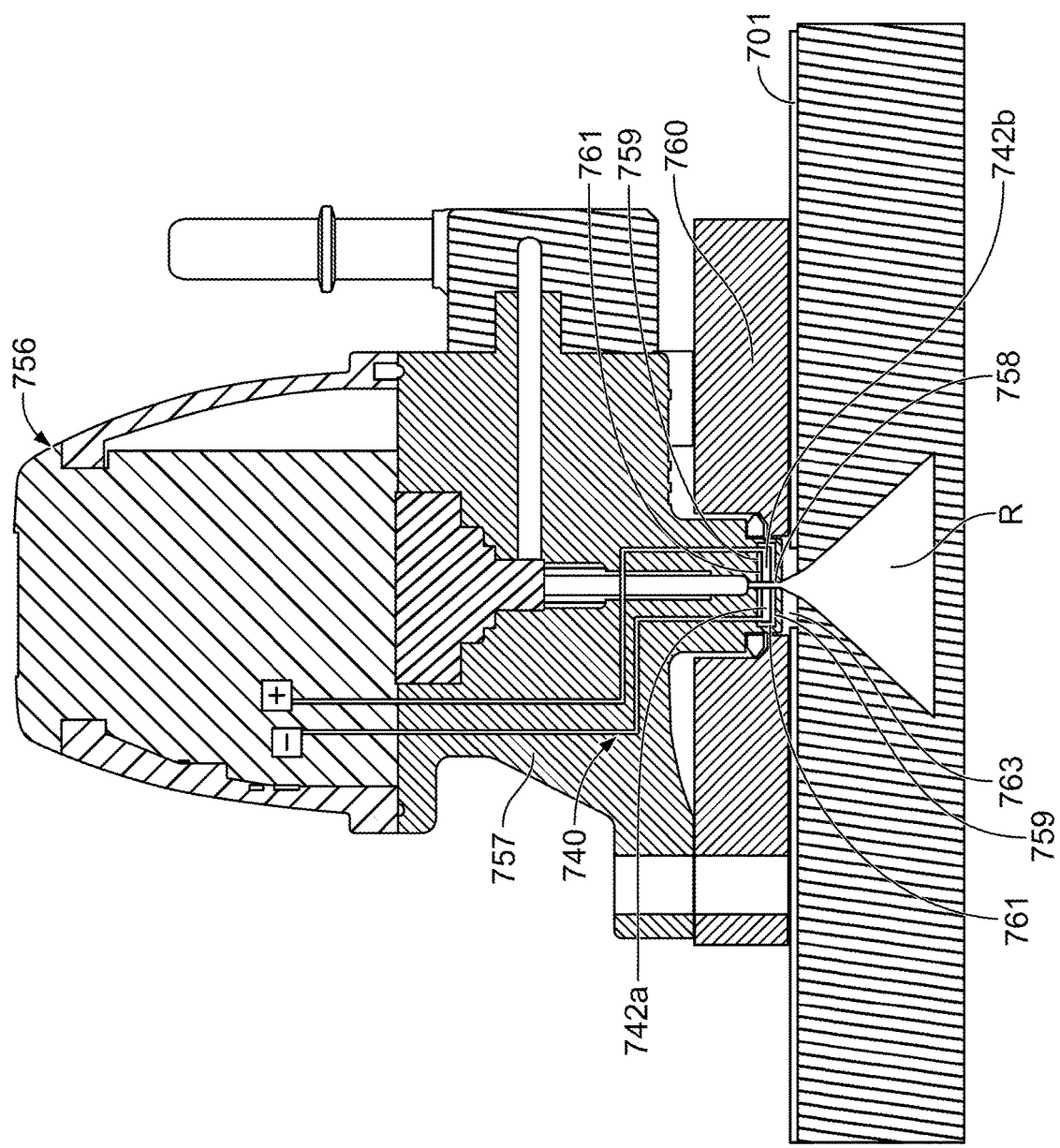
FIG. 11 is a side cross-section view of a reductant injector and a virtual mixer integrated in the reductant injector, according to another embodiment.

In some embodiments, a virtual mixer may be configured to electrolyze the reductant before insertion into a housing of an aftertreatment system. For example, FIG. 11 is a side cross-section view of a reductant injector 756 having a virtual mixer 740 operatively coupled thereto, according to an embodiment. The reductant injector 756 may be disposed on a mounting plate 760 that is disposed around a reductant port 763 defined in a sidewall of a housing 701 of an aftertreatment system (e.g., the aftertreatment system 100). The reductant injector is configured to insert a spray plume R of a reductant through an outlet (e.g., a nozzle) of the reductant injector 756 into the housing 701 via the reductant port 763.

The virtual mixer 740 includes a cathode 742a disposed on one side of the outlet 758, and an anode 742b disposed on an opposite side of the outlet 758. The cathode 742a and the anode 742b are integrated the reductant injector 756. For example, as shown in FIG. 11, the cathode 742a and the anode 742b are disposed within a reductant injector housing 757 of the reductant injector 756. In some embodiments, the cathode 742a and the anode 742b may be insulated from the reductant injector housing 757 by an insulating material 761. For example, cavities 759 may be defined in the reductant injector housing 757 within which the cathode 742a and the anode 742b are disposed. Insulating material 761 may be disposed in the cavities 759 between the walls of the cavities 759 and respective cathode 742a and anode 742b to electrically insulate the cathode 742a and the anode 742b from the reductant injector housing 757. The virtual mixer is configured to generate an electric field between the cathode 742a and the anode 742b (e.g., by applying a voltage in a range of 5 Volts to 50 Volts, or an electric power in a range of 25 Watts to 150 Watts across the cathode 742a and the anode 742a to induce electrolysis in the reductant prior to insertion into the housing 701. Electrolysis may decompose at least a portion of the inserted reductant and may release ammonia facilitating mixing with the exhaust gas and reducing reductant deposits.

Figure 12:
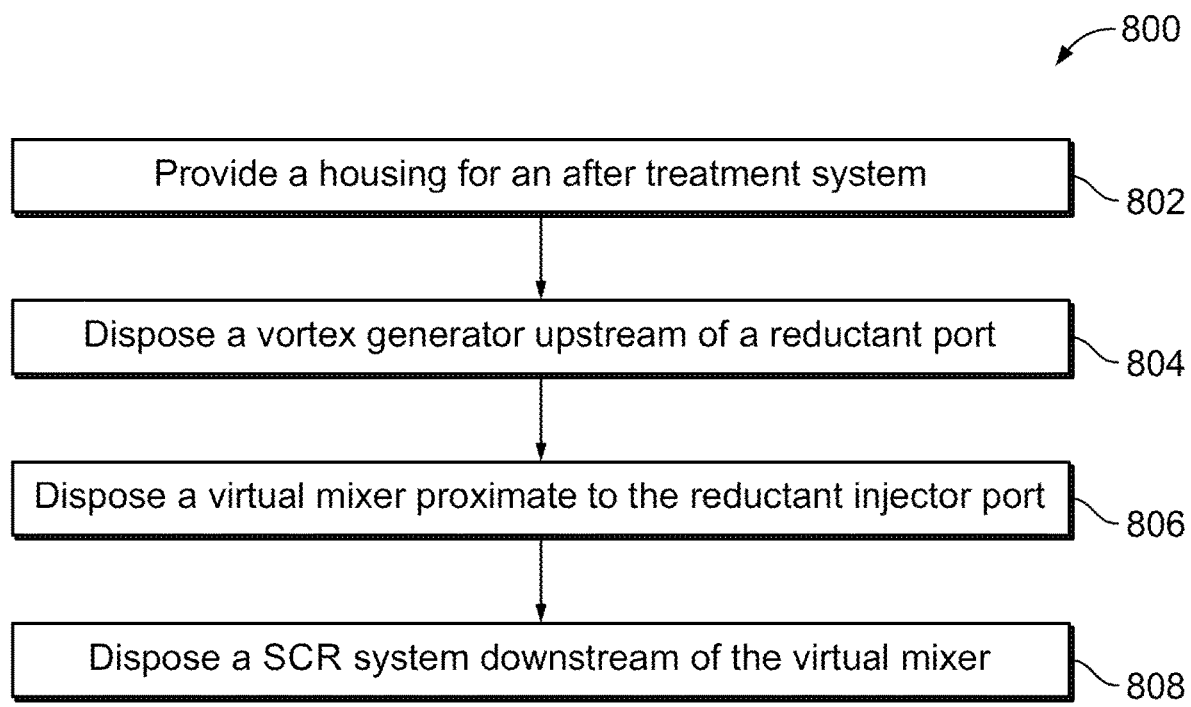
FIG. 12 is a schematic flow chart of a method for fabricating an aftertreatment system, according to an embodiment.

FIG. 12 is a schematic flow chart of a method 800 for fabricating an aftertreatment system (e.g., the aftertreatment system 100), according to an embodiment. The method 800 includes providing a housing (e.g., the housing 101) for an aftertreatment system (e.g., the aftertreatment system 100), at step 802. The housing may include a reductant port (e.g., the reductant port 252) configured to mount a reductant injector (e.g., the reductant injector 156, 256).

At step 804, a vortex generator is disposed in the housing upstream of the reductant port. For example, the vortex generator 120 having the deflector 122 and/or the impaction plate 130 having the plurality of deflectors 132 may be disposed in the housing 101. In some embodiments, the housing of the aftertreatment system may also include one or more bends. In such embodiments, the method 800 may also include disposing one or more airfoils (e.g., the airfoils 330*a*, 330*b*, 330*c*) in the bend, as previously described herein. At step 806, a virtual mixer (e.g., the virtual mixer 140, 440, 540, 640, 740) is disposed in the housing 101 in the reductant injector, or between the reductant inject. At step 608, a SCR system (e.g., the SCR system 150) is disposed in the housing 101 downstream of the virtual mixer. The vortex generator and/or the virtual mixer facilitate mixing of the reductant with the exhaust gas and reduce reductant deposits.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for treating constituents of an exhaust gas produced by an engine, comprising:
    a housing;
    a selective catalytic reduction (SCR) system disposed within the housing;
    a reductant injector disposed on a sidewall of the housing upstream of the SCR system and configured to insert a reductant into the exhaust gas through a reductant port defined in a surface of the housing; and
    a vortex generator disposed in the housing, the vortex generator comprising a first deflector disposed on said surface of the housing through which the reductant port is defined, wherein:
        the first deflector is disposed proximate to and upstream of the reductant port, and
        the first deflector has an upstream lateral surface that extends perpendicularly from said surface of the housing, a downstream lateral surface that extends from said surface of the housing, and an end surface that connects the plurality of lateral surfaces, the end surface being angled so as to extend away from said surface of the housing in a direction of exhaust gas flow, such that the first deflector is configured to generate vortices in a portion of the exhaust gas flowing over the first deflector and said portion of the exhaust gas remains attached to the surface of the housing at a downstream location of the surface.

2. The aftertreatment system of claim 1, wherein:
    the vortex generator further comprises an impaction plate disposed within the housing along an axial flow path of the exhaust gas, the impaction plate disposed along an injection axis of the reductant injector; and
    at least one second deflector is disposed on the impaction plate upstream of the reductant injector.

3. The aftertreatment system of claim 2, wherein:
    the at least one second deflector comprises a plurality of second deflectors, and
    adjacent second deflectors of the plurality of second deflectors are oriented at opposing angles relative to each other.

4. The aftertreatment system of claim 1, further comprising:
    a virtual mixer disposed in the housing upstream of the SCR system, the virtual mixer comprising at least one electrode configured to generate an electric field across the mixer, the electric field configured to cause droplets of the reductant inserted into the exhaust gas to break into smaller droplets.

5. The aftertreatment system of claim 4, wherein:
    the virtual mixer is disposed between the reductant injector and the housing, and
    the at least one electrode comprises an electromagnet defining an aperture configured to allow the reductant to be inserted therethrough into the housing, the electromagnet configured to generate an electromagnetic field across a spray plume of the reductant inserted by the reductant injector into the housing.

6. The aftertreatment system of claim 5, wherein:
the virtual mixer further comprises a mounting plate on which the reductant injector is mounted, and
the electromagnet is integrated into the mounting plate.

7. The aftertreatment system of claim 4, wherein the cathode and the anode are integrated within the reductant injector.

8. The aftertreatment system of claim 4, wherein:
the virtual mixer comprises:
 a mixer tube, and
 a pair of electrodes disposed on opposing radial ends of the mixing tube proximate to a downstream end of the mixing tube; and
the at least one deflector of the vortex generator is disposed on the mixer tube proximate to an upstream end of the mixer tube.

9. The aftertreatment system of claim 1, further comprising a virtual mixer, the virtual mixer comprising:
a cathode disposed on a first side of an outlet of the reductant injector, and
an anode disposed on a second side of the outlet of the reductant injector, which is opposite the first side,
wherein the virtual mixer is configured to generate an electric field between the cathode and the anode to induce electrolysis in the reductant prior to insertion of the reductant into the housing.

10. An aftertreatment system for treating constituents of an exhaust gas produced by an engine, comprising:
a housing;
a selective catalytic reduction (SCR) system disposed within the housing;
a reductant injector disposed on a sidewall of the housing upstream of the SCR system and configured to insert a reductant into the exhaust gas through a reductant port defined in a surface of the housing; and
a vortex generator disposed in the housing, the vortex generator comprising:
 at least one first deflector disposed on said surface of the housing through which the reductant port is defined, the at least one first deflector being disposed proximate to and upstream of the reductant port, the at least one first deflector configured to generate vortices in a portion of the exhaust gas flowing over the at least one first deflector such that the portion of the exhaust gas remains attached to the surface of the housing at a downstream location of the surface, and
 an impaction plate disposed within the housing along an axial flow path of the exhaust gas, the impaction plate disposed along an injection axis of the reductant injector; and
 at least one second deflector is disposed on the impaction plate upstream of the reductant injector.

11. The aftertreatment system of claim 10, wherein:
the impaction plate further comprises a plurality of at least one second deflectors, and
adjacent second deflectors of the plurality of at least one second deflectors are oriented at opposing angles relative to each other.

* * * * *